2,827,457
THIADIAZOLE COMPOUNDS

Ronald Slack, Chelsea, London, David Lord Pain, Rainham, and Harry James Barber, Gidea Park, England, assignors to May & Baker Limited, Dagenham, England, a British company No Drawing. Application January 14, 1957
Serial No. 633,842

Claims priority, application Great Britain
January 18, 1956

4 Claims. (Cl. 260—239.95)

This invention is for improvements in or relating to heterocyclic compounds and is especially, though not exclusively, concerned with p-amino-benzenesulphonamido thiadiazole compounds and with processes for their preparation.

It is well known that, of the very large number of p-amino-benzenesulphonamido compounds (including their derivatives) that have been made and tested by various workers for possible antibacterial or other useful therapeutic activity, only a very few have proved to be of sufficient relative merit to justify their use in human or veterinary therapy. Despite intensive research and experimentation over the past decade or so it is still not possible to predict whether a given compound will possess useful anti-bacterial activity. Among the many heterocyclic compounds of the aforesaid type that have been proposed as antibacterial agents are certain 1:3:4-thiadiazole compounds but none of these hase been demonstrated to possess an order of utility comparable to that of those sulphonamido-heterocyclic compounds that have received wide acceptance by the medical profession such as 2-(p-aminobenzenesulphonamido)thiazole, known also by the generic name sulphathiazole.

In accordance with the present invention, it has now been unexpectedly discovered that the hitherto unknown 1:2:3-thiadiazole compound represented by the formula:

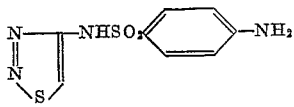

its salts with, for example alkali metals and alkaline earth metals, and certain $N^4$-acyl derivatives, for example the phthalyl and succinyl derivatives, show antibacterial activity as great as, or greater than, that of sulphathiazole.

In the foregoing formula, the 5-position of the thiadiazole ring may optionally be occupied by a hydrocarbon substituent for example, a methyl or a higher alkyl, cycloalkyl or aralkyl group, or by a hydroxyalkyl, alkoxy, aralkoxy, hydroxyalkoxy or hydroxyaralkoxy group.

The new compounds may be prepared by methods analogous to those described in the literature for the preparation of N'-heterocyclic derivatives of sulphanilamide. In particular, they may be prepared by the reaction of a p-R-benzenesulphonyl halide (where R is a group convertible into a primary amino group) with a suitable 4-aminothiadiazole followed if necessary by conversion of the group R into a primary amino group or a salt or acyl derivative thereof. The reaction may be carried out in the presence of a basic condensing agent and of an organic or aqueous solvent. The solvent and condensing agent may be the same substance, for example pyridine.

The 4-aminothiadiazoles which are the intermediates for the products of the present invention are themselves new, and may be prepared for example from the corresponding carboxylic acids by the application of known methods.

The invention is illustrated by the following examples.

Example I

A solution of 4-amino-5-methyl-1:2:3-thiadiazole (15 g.) in pyridine (75 ml.) is added slowly to a solution of freshly purified p-acetamidobenzenesulphonyl chloride (30.6 g.) in pyridine (75 ml.) with cooling. The solution is set aside at room temperature for 65 hours and is then poured into water. The precipitated solid is filtered off, washed with water and purified by precipitation with 2 N-hydrochloric acid from a solution in N-sodium hydroxide. The product has a melting point of 190° C.(d).

4 - p - acetamidobenzenesulphonamido - 5 - methyl - 1:2:3-thiadiazole (27 g.) (obtained as above) is heated under reflux with N-hydrochloric acid (1 l.) until a clear solution is obtained (ca. 30 minutes). The solution is cooled and adjusted to pH 6 by the addition of N-sodium hydroxide solution. The solid is collected and crystallised from ethanol to give 4-p-aminobenzenesulphonamido-5-methyl-1:2:3-thiadiazole as pale yellow flattened needles, M. P. 170° C.(d).

The intermediate 4-amino-5-methyl-1:2:3-thiadiazole is obtained as follows:

Ethyl 5-methyl-1:2:3-thiadiazole-4-carboxylate (20 g.) (Wolff, Ann., 1904, 333, 6) is dissolved in ethanol (150 ml.) and the solution is mechanically stirred at 40° C. A solution of hydrazine hydrate (80%; 7.5 ml.) in ethanol (20 ml.) is added dropwise over 30 minutes. The solution is maintained at 40° C. for a further 3 hours and is then concentrated to small bulk in vacuo below 40° C. and cooled. The hydrazide separates and is filtered off. A further amount is obtained by heating the filtrate at 50° C. with an excess of hydrazine hydrate. Crystallisation from ethanol gives 5-methyl-1:2:3-thiadiazole-4-carboxyhydrazide as colourless plates, M. P. 152–153° C.

5-methyl-1:2:3-thiadiazole-4-carboxyhydrazide (63 g.) (obtained as above) is dissolved in water (600 ml.) containing 6 N-hydrochloric acid (70 ml.). Ether (600 ml.) is added and the mixture cooled to 0° C. A solution of sodium nitrite (30 g.) in water (80 ml.) is added slowly with vigorous stirring, the reaction temperature being maintained below 10° C. (ice added internally when necessary). When all the nitrite has been added, stirring is continued for a further 10 minutes and the layers are separated. The aqueous solution is extracted twice with ether, the combined ethereal solutions are washed with aqueous sodium hydrogen carbonate, dried over calcium chloride for 5 minutes and poured into dry benzene (800 ml.). The ether is distilled off through a column. The benzene solution of the azide is heated on a water-bath at 80° C. until evolution of nitrogen ceases and fuming hydrochloric acid (400 ml.) is then added cautiously through a reflux condenser to the hot solution. The mixture is then evaporated to dryness in vacuo. The residue is extracted with hot water and the extract cooled and filtered. The filtrate is neutralized with sodium hydrogen carbonate and continuously extracted with ether. The extract is evaporated to dryness in vacuo and the residue is crystallised from benzene to give the amine as colourless prisms, M. P. 128° C. (d).

Example II

A solution of 4-amino-1:2:3-thiadiazole (15 g.) in dry pyridine (150 ml.) was added slowly, with cooling and stirring, to a solution of freshly purified p-acetamidobenzenesulphonyl chloride (35 g.) in pyridine (150 ml.). The mixture was set aside at room temperature for 48 hours and then poured into an excess of cold dilute sulphuric acid. The crude acetylsulphonamide, which is sufficiently pure for hydrolysis, was collected and washed with water. It may be recrystallised from ethanol to give prisms, M. P. 173–175° C. (d).

The crude 4-p-acetamidobenzene sulphonamido-1:2:3-thiadiazole obtained as above was heated under reflux with N-hydrochloric acid (1000 ml.) until solution was complete. The solution was cooled and treated with 2 N-sodium hydroxide. The required 4-p-aminobenzene sulphonamido-1:2:3-thiadiazole separated at pH 6 and was collected, washed and recrystallised from ethanol to give colourless plates, M. P. 157–158° C. (d).

The intermediate 4-amino-1:2:3-thiadiazole which separates from benzene-light petroleum mixture in pale yellow needles, M. P. 44–46° C., is obtained in a manner analogous to that described in Example I for the 5-methyl derivative. Thus, 1:2:3-thiadiazole-4-carboxylic acid (Hurd and Mori, J. Am. Chem. Soc. 1955, 77, 5359) is converted by traditional methods into the hitherto unknown carbonyl chloride, M. P. 34–35° C., carboxyhydrazide, M. P. 208–210° C., carboxyazide, M. P. 89° C. and thence to the amine.

The product of the preceding example possesses particularly outstanding utility as an anti-bacterial agent.

We claim:

1. A compound selected from the class consisting of the 1:2:3-thiadiazole compound represented by the formula:

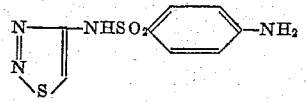

compounds of the said formula containing a 5-lower substituent in the thiadiazole nucleus and their alkali metal and alkaline earth metal salts.

2. A 1:2:3-thiadiazole compound of the formula:

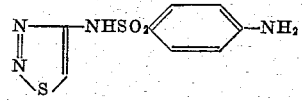

3. A 1:2:3-thiadiazole compound of the formula:

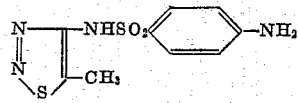

4. An alkali metal salt of a 1:2:3-thiadiazole compound of the formula:

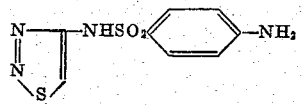

No references cited.

U. S. DEPARTMENT OF COMMERCE
PATENT OFFICE

CERTIFICATE OF CORRECTION

Patent No. 2,827,457     Ronald Slack et al.          March 18, 1958

It is hereby certified that error appears in the printed specification of the above numbered patent requiring correction and that the said Letters Patent should read as corrected below.

Column 4, line 1, after "lower" insert --alkyl--.

Signed and sealed this 1st day of July 1958.

(SEAL)
Attest:
KARL H. AXLINE
Attesting Officer

ROBERT C. WATSON
Commissioner of Patents